United States Patent
Poon et al.

(10) Patent No.: US 11,755,939 B2
(45) Date of Patent: Sep. 12, 2023

(54) SELF-SUPERVISED SELF SUPERVISION BY COMBINING PROBABILISTIC LOGIC WITH DEEP LEARNING

(71) Applicant: Microsoft Technology Licensing, LLC, Redmond, WA (US)

(72) Inventors: Hoifung Poon, Bellevue, WA (US); Hunter Lang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 243 days.

(21) Appl. No.: 16/911,097

(22) Filed: Jun. 24, 2020

(65) Prior Publication Data
US 2021/0406741 A1    Dec. 30, 2021

(51) Int. Cl.
| | |
|---|---|
| *G06F 18/20* | (2023.01) |
| *G06F 18/2323* | (2023.01) |
| *G06N 7/01* | (2023.01) |
| *G06F 18/22* | (2023.01) |
| *G06F 18/214* | (2023.01) |
| *G06F 18/2113* | (2023.01) |

(52) U.S. Cl.
CPC ............. *G06N 7/01* (2023.01); *G06F 18/214* (2023.01); *G06F 18/2113* (2023.01); *G06F 18/22* (2023.01)

(58) Field of Classification Search
USPC ....................................... 706/1–62, 900–934
See application file for complete search history.

(56) References Cited

U.S. PATENT DOCUMENTS

| | | | | |
|---|---|---|---|---|
| 11,537,874 | B1* | 12/2022 | Wang | G06N 3/08 |
| 2014/0355879 | A1* | 12/2014 | Agosta | G06T 7/11 |
| | | | | 382/199 |
| 2017/0124479 | A1* | 5/2017 | Baughman | G06N 20/00 |
| 2017/0154103 | A1* | 6/2017 | Agarwalla | G06F 16/353 |
| 2018/0136995 | A1* | 5/2018 | Sheppard | G06N 7/01 |
| 2021/0027889 | A1* | 1/2021 | Neil | G16H 10/60 |
| 2021/0117854 | A1* | 4/2021 | Park | G06F 18/2178 |
| 2021/0209412 | A1* | 7/2021 | Quader | G06F 18/214 |
| 2021/0256616 | A1* | 8/2021 | Hayward | G06V 30/194 |

OTHER PUBLICATIONS

Wang et al., Deep Probabilistic Logic: A Unifying Framework for Indirect Supervision (Year: 2018).*

(Continued)

*Primary Examiner* — Marcellus J Augustin
(74) *Attorney, Agent, or Firm* — Ray Quinney & Nebeker; Tiffany Healy

(57) ABSTRACT

The present disclosure relates to devices and methods for determining new virtual evidence to use with a deep probabilistic logic module. The devices and methods may receive output from a deep probabilistic logic module in response to running an initial set of virtual evidence through the deep probabilistic logic module. The devices and methods may use the output to automatically propose at least one factor as new virtual evidence for use with the deep probabilistic logic module. The devices and methods may add the new virtual evidence to the deep probabilistic logic module.

19 Claims, 8 Drawing Sheets

(56) References Cited

OTHER PUBLICATIONS

Devlin, et al., "BERT: Pre-training of Deep Bidirectional Transformers for Language Understanding", In repository of arXiv, arXiv:1810.04805, Oct. 11, 2018, 14 Pages.
Domke, Justin, "Learning Graphical Model Parameters with Approximate Marginal Inference", In IEEE Transactions on Pattern Analysis and Machine Intelligence, vol. 35, Issue 10, Oct. 1, 2013, pp. 2454-2467.
Druck, et al., "Learning from Labeled Features Using Generalized Expectation Criteria", In Proceedings of the 31st annual international ACM SIGIR Conference on Research and Development in Information Retrieval, Jul. 20, 2008, pp. 595-602.
Pearl, Judea, "Probabilistic Reasoning in Intelligent Systems: Networks of Plausible Inference", In Publication of Elsevier, 1988, 573 Pages.
Ratner, et al., "Data Programming: Creating Large Training Sets, Quickly", In Advances in Neural Information Processing System, Dec. 5, 2016, pp. 1-9.
Varma, et al., "Socratic Learning: Augmenting Generative Models to Incorporate Latent Subsets in Training Data", In repository of arXiv, arXiv:1610.08123v4, Sep. 28, 2017, pp. 1-17.
Wang, et al., "Deep Probabilistic Logic: A Unifying Framework for Indirect Supervision", In repository of arXiv, arXiv:1808.08485, Aug. 26, 2018, 12 Pages.
Winn, et al., "Variational Message Passing", In Journal of Machine Learning Research, vol. 6, Apr. 2005, pp. 661-694.
Wolf, et al., "HuggingFace's Transformers: State-of-the-art Natural Language Processing", In repository of arXiv, arXiv:1910.03771v2, Oct. 14, 2019, pp. 1-11.
Lang, et al., "Self-Supervised Self Supervision by Combining Deep Learning and Probabilistic Logic", In Repository of arXiv:2012.12474v1, Dec. 23, 2020, 12 Pages.
Pathak, et al., "Self-Supervised Exploration Via Disagreement", In Repository of arXiv:1906.04161v1, Jun. 10, 2019, 10 Pages.
"International Search Report and Written Opinion Issued in PCT Application No. PCT/US21/032829", dated Oct. 15, 2021, 13 Pages.
Varma, et al., "Snuba: Automating Weak Supervision to Label Training Data", In Proceedings of the VLDB Endowment, vol. 12, Issue 3, Nov. 1, 2018, pp. 223-236.
Wang, et al., "Evidence Sentence Extraction for Machine Reading Comprehension", In Repository of arXiv:1902.08852v1, Feb. 23, 2019, 14 Pages.
Wang, Hai, "Knowledge Efficient Deep Learning for Natural Language Processing", In a Thesis Submitted for Degree of Doctor of Philosophy in Computer Science, Sep. 2020, 94 Pages.

\* cited by examiner

SELF-SUPERVISED SELF SUPERVISION BY COMBINING PROBABILISTIC LOGIC WITH DEEP LEARNING

BACKGROUND

A challenge in machine learning is labeling training examples at scale. Self-supervised machine learning may compensate for the lack of direct supervision by leveraging prior knowledge to automatically generate noisy examples. Deep probabilistic logic (DPL) is a unifying framework for self-supervised machine learning that represents unknown labels as latent variables, and combines diverse self-supervisions as virtual evidences in a graphical model to train a deep neural network via variational EM. While DPL is successful in combining pre-specified self-supervision, manually crafting such self-supervisions to attain high performance may still be tedious and challenging.

As such, there is a need in the art for improvements in machine learning.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a method. The method may include receiving output from a deep probabilistic logic module in response to running an initial set of virtual evidence through the deep probabilistic logic module. The method may include using the output to automatically determine at least one factor as new virtual evidence for use with the deep probabilistic logic module. The method may include adding the new virtual evidence to the deep probabilistic logic module.

Another example implementation relates to a computer device. The computer device may include a memory to store data and instructions; and at least one processor operable to communicate with the memory, wherein the at least one processor is operable to: receive output from a deep probabilistic logic module in communication with the computer device in response to running an initial set of virtual evidence through the deep probabilistic logic module; use the output to automatically determine at least one factor as new virtual evidence for use with the deep probabilistic logic module; and add the new virtual evidence to the deep probabilistic logic module.

Another example implementation relates to a computer-readable medium storing instructions executable by a computer device. The computer-readable medium may include at least one instruction for causing the computer device to receive output from a deep probabilistic logic module in communication with the computer device in response to running an initial set of virtual evidence through the deep probabilistic logic module. The computer-readable medium may include at least one instruction for causing the computer device to use the output to automatically determine at least one factor as new virtual evidence for use with the deep probabilistic logic module. The computer-readable medium may include at least one instruction for causing the computer device to add the new virtual evidence to the deep probabilistic logic module.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

DETAILED DESCRIPTION

Figure 1:
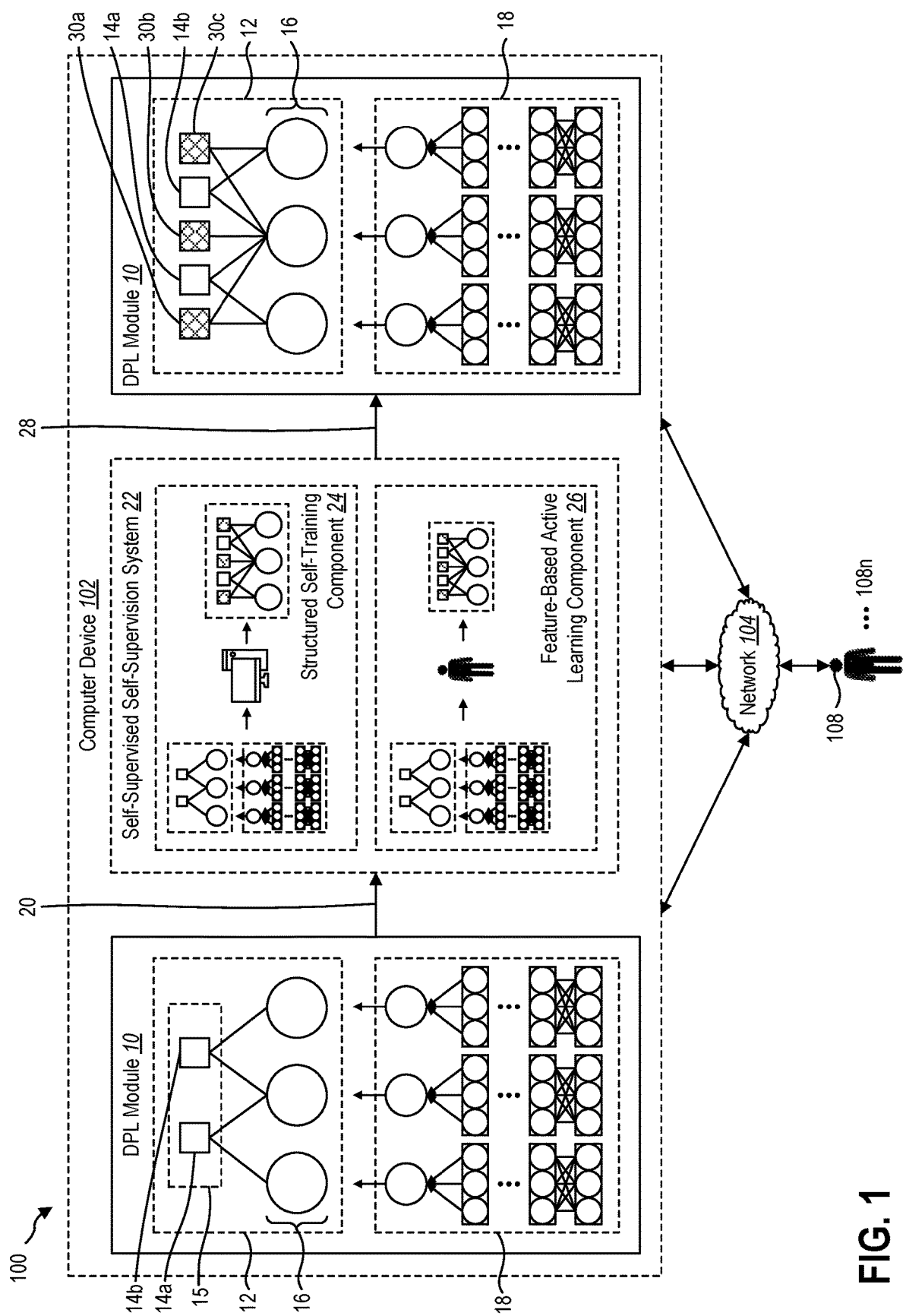
FIG. 1 illustrates an example environment for use with determining new virtual evidence in accordance with an implementation of the present disclosure.

This disclosure generally relates to machine learning. Contemporary methods in machine learning typically require very large amounts of labeled data to obtain good performance. Popular neural network architectures tend to need many thousands of training examples. While methods like transfer learning have enjoyed significant success in lower-data settings, the methods still require moderate amounts of labeled data to perform well. However, there are areas where it may be very expensive or unrealistic to produce a high volume of labeled data. Self-supervised machine learning typically deals with settings where labeled data is very limited and/or potentially expensive to obtain. One example where labeled data may be very limited or potentially expensive to obtain is healthcare. Self supervision may use a set of noisy, heuristically-generated, and possibly incomplete labels to learn a model, such as, but not limited to a discriminative or conditional model.

One example of self supervision may include using natural language processing (NLP) to automatically parse the text of the dataset and output labels for words and/or sentences of the dataset. For example, NLP may be used to automatically parse text regarding relation extraction. In extracting whether a sentence expresses the relation "A purchased B," self supervision may use a database of recent purchases (A,B). For example, "A" may be Company A and "B" may be Company B. Company A and Company B may be in the database of recent purchases. When A and B are both in a sentence in the database, self-supervision may indicate that the sentence expresses the relation "A purchased B." If the sentence is "Company A recently acquired Company B," this self-supervision is accurate. If the sentence is a list of technology companies that does not express acquisition information, the self-supervision is inaccurate.

Another example of self supervision may include a sentiment analysis (e.g., determining a positive sentiment or a negative sentiment). An example piece of self-supervision may include a word and its associated sentiments, such as "good" and positive. If "good" is in a sentence, this piece of self-supervision may indicate that the sentence expresses positive sentiment. If the sentence is "this movie was good," the self-supervision is accurate. However, the sentence may say "this movie was not good," in which case the self-supervision is inaccurate.

Self supervision may use several sources of prior knowledge, such as, knowledge bases or human-specified labeling functions to learn a model. The sources for self supervision (e.g., knowledge bases, and/or labeling functions) may be imperfect and hard to obtain. A knowledge base may be incomplete and may be especially noisy when used in domains that do not perfectly match the one for which the knowledge base was originally compiled. For example, if PDF is recorded in a biomedical knowledge base as a gene entity, then mentions of "PDF" in biomedical documents probably refer to this gene. However, such rules may be noisy, since "PDF" could also refer to the document format. Additionally, multiple rules may conflict with each other, making it unclear how to produce a label. Labeling functions may also require some programming expertise and the functions may not cover all the cases in the data.

The devices and methods may automatically propose new sources of self supervision to help alleviate the problems associated with self supervision. By automatically proposing new sources of self supervision, the devices and methods may provide data for machine learning systems without having individuals produce or create all the data used to train the machine learning systems. For example, the data may be used by the machine learning systems to train a model, such as, but not limited to a discriminative or conditional model. This disclosure includes several practical applications that provide benefits and/or solve problems associated with improving machine learning.

The devices and methods may use an initial set of virtual evidence used by a deep probabilistic logic (DPL) module in training a model and may expand and/or grow the virtual evidence used by the DPL module. The initial set of virtual evidence may be a seed set of information curated by individuals that defines a probabilistic distribution over the unknown labels for the input data. The probabilistic distribution may include a preference for what the labels may potentially be for the selected data. The initial set of virtual evidence may be used to create a factor graph to provide to the DPL module. The DPL module may use the factor graph for producing labels to use in training a model. The devices and methods may add additional structure to the factor graph used by the DPL module during the training of the model.

The devices and methods may use a self-supervised self-supervision system to receive output from a DPL module and may use the output from the DPL module to automatically propose one or more factors to add as new virtual evidence. The DPL module may represent the virtual evidence as factors in a factor graph over the unknown labels. Factors may include any function of the observed data and latent label variables.

The devices and methods may add the new virtual evidence to the DPL module and the DPL module may run the new virtual evidence through the DPL module along with the initial virtual evidence. The self-supervised self-supervision system may use the new output from the DPL module based on the new virtual evidence and the initial virtual evidence to propose additional factors to add as new virtual evidence for use with the DPL module. Self-supervised self-supervision system may continue to add new virtual evidence for use with DPL module until the model is trained.

In an implementation, a self-supervised self-supervision system may use structured self-training to automatically add the proposed new factors as new virtual evidence for use with DPL module. For example, a self-supervised self-supervision system may include a structured self-training component that applies a score function to determine a score for the proposed new factors. The structured self-training component may automatically select one or more high scoring factors as the new virtual evidence. As such, the structured self-training may automatically add new virtual evidence for use with the DPL module without human input.

In another implementation, a self-supervised self-supervision system may use featured-based active learning to add the proposed new factors as new virtual evidence for use with DPL module. For example, a self-supervised self-supervision system may include a featured-based active learning component that applies a score function to determine a confidence score for the proposed new factors. The featured-based active learning component may select one or more of the proposed factors for review based on the confidence score. The feature-based active learning component may send the one or more factors selected for review to one or more individuals. The individuals may provide a response, such as, but not limited to a label for the factors or a verification of a previously applied label. The feature-based active learning component may use the response from the individuals to generate the new virtual evidence for the one or more factors sent for review.

The self-supervised self-supervision system may use one or more diagnostics for selecting structured self-training or featured-based active learning for generating the new virtual evidence. As such, the self-supervised system may switch between structured self-training and featured-based active learning for proposing and generating the new virtual evidence for use with the DPL module.

As such, the devices and methods may generalize DPL with a meta-self-supervision capability that may propose and learn new virtual evidence. Starting from a seed DPL, the devices and methods may iteratively self-teach itself by proposing new virtual evidences either directly (e.g., structured self-training) or by querying a human expert (e.g., active learning of self supervision). The devices and methods may significantly reduce the cost and/or cognitive challenges in acquiring self-supervisions by leveraging a deep neural network to propose candidate virtual evidences.

Thus, the devices and methods may not be limited to an initial set of virtual evidence. The devices and methods may use an initial set of virtual evidence and may continue to expand and grow the virtual evidence used by a DPL module during the training of the model. The devices and methods may provide different ways for proposing new evidence to use in training a model. By growing and expanding the virtual evidence used by a DPL module to train a model, a more complete model may be trained. For example, more complex rules may be created for labeling data points. In addition, the newly added virtual evidence may help create rules that cover the labels of multiple data points (joint inference). The newly added virtual evidence may also help reduce gaps and/or missing features from the data. As such, by using an initial seed of virtual evidence, the devices and methods may expand the training capabilities of models by machine learning by providing additional virtual evidence to use during the training process.

Referring now to FIG. 1, an example environment 100 for use with generating new virtual evidence 28 includes a computer device 102 having a deep probabilistic logic (DPL) module 10. DPL module 10 may use a factor graph 12 to train a discriminative model for label prediction. Component 18 may include any discriminative model but is depicted as a deep neural network and referred throughout as deep neural network 18.

Factor graph 12 may include one or more latent label variables 16 for data points. Latent label variables 16 represent the unknown labels for each data point. Example data points may include sentences or text documents. Determining labels for data points may take a lot of effort and/or may be potentially expensive to obtain. Depending on the data, an expert or a specialist in a field may need to label the data. For example, an expert or specialist may be needed to label data used in training models for healthcare. Other data may be labeled using the public. For example, crowd sourcing may be used to provide the labels for the data relating to movie reviews. Moreover, the labels may be imperfect and/or hard to obtain for the data sets.

Factor graph 12 may also include an initial set of virtual evidence 15. The initial set of virtual evidence 15 represents a seed set of self-supervision used by DPL module 10. For example, the initial set of virtual evidence may be a collection of words and associated sentiment labels, such as "good" and "positive." If a document contains the word "good," this virtual evidence suggests that the document is more likely to express positive sentiment, so the latent label variable for that document (the true, unknown sentiment) is likely to be positive. DPL module 10 may use this initial virtual evidence to train a model. In an implementation, the initial set of virtual evidence 15 may be curated by individuals. The initial set of virtual evidence 15 may include a plurality of noisy virtual evidence 14a, 14b that may define a probabilistic distribution of variables over the unknown latent variable labels 16. The initial set of virtual evidence 15 may be predefined using, for example, a knowledge base to determine a distribution over the latent variable labels 16. In addition, the virtual evidence 14a, 14b may include a number that represents a confidence in the estimated distribution of the data over the latent variable labels 16. The confidence may vary for each of the virtual evidences 14a, 14b. The virtual evidence 14a, 14b used to create the latent variable labels 16 may be noisy and/or may conflict with each other, resulting in uncertainty in producing a label for the virtual evidence 14a, 14b.

The deep neural network 18 may resolve discrepancies between the predictions for the variables in the virtual evidence 14a, 14b and the latent variable labels 16 by providing updates and/or recommendations to the virtual evidence 14a, 14b. For example, the virtual evidence 14a, 14b may predict a positive sentiment label in general for the word "good." The virtual evidence 14a, 14b may apply an initial positive sentiment label to a sentence with the word "good." However, a sentence may say "this movie was not good." As such, the deep neural network 18 may indicate that the label for the sentence is incorrect and needs to change from a positive sentiment to a negative sentiment. The factor graph 12 may refine the values for the virtual evidence 14a, 14b based on the output from the deep neural network 18. The factor graph 12 may continue to adjust the values for the virtual evidence 14a, 14b until the output from the deep neural network 18 and the factor graph 12 becomes stabilized with minimum or no conflicts between the proposed labels by the virtual evidence 14a, 14b and the output from the deep neural network 18.

The output 20 from the DPL module 10 may be the stabilized factor graph 12 with any revised values for the initial set of virtual evidence 15 and the latent variable labels 16. The output 20 from the DPL module 10 may be sent to a self-supervised self-supervision system 22 on computer device 102.

While a single computer device 102 is illustrated, environment 100 may include a plurality of computer devices 102 in communication via a network 104. Moreover, each computer device 102 may include one or more DPL modules 10 operating on each computer device 102. In addition, the self-supervised self-supervision system 22 may be distributed among a plurality of computer devices 102.

Computer device 102 may include any mobile or fixed computer device, which may be connectable to a network. Computer device 102 may include, for example, a mobile device, such as, a mobile telephone, a smart phone, a personal digital assistant (PDA), a tablet, or a laptop. Additionally, or alternatively, computer device 102 may include one or more non-mobile devices such as a desktop computer, server device, or other non-portable devices. Additionally, or alternatively, computer device 102 may include a gaming device, a mixed reality or virtual reality device, a music device, a television, a navigation system, or a camera, or any other device having wired and/or wireless connection capability with one or more other devices. Computer device 102 may include features and functionality described below in connection with FIG. 8.

In addition, the components of self-supervised self-supervision system 22 and/or DPL module 10 may include hardware, software, or both. For example, the components of self-supervised self-supervision system 22 and/or DPL module 10 may include one or more instructions stored on a computer-readable storage medium and executable by processors of one or more computing devices. When executed by the one or more processors, the computer-executable instructions of one or more computing devices (e.g., self-supervised self-supervision system 22 and/or DPL module 10) can perform one or more methods described herein. Alternatively, the components of self-supervised self-supervision system 22 and/or DPL module 10 may include hardware, such as a special purpose processing device to perform a certain function or group of functions. Additionally, or alternatively, the components of self-supervised self-supervision system 22 and/or DPL module 10 may include a combination of computer-executable instructions and hardware.

Self-supervised self-supervision system 22 may receive the output 20 from the DPL module 10 and may use the output 20 to generate one or more new virtual evidence 28 to add to the factor graph 12 of DPL module 10. Self-supervised self-supervision system 22 may use the output 20 to understand a current state or status of the virtual evidence 14a, 14b and/or a current state or status of the deep neural network 18. Self-supervised self-supervision system 22 may consider a current state or status of DPL module 10 in proposing new virtual evidence 28 to add DPL module 10. For example, self-supervised self-supervision system 22 may determine to add new virtual evidence 28 for use with DPL module 10 based on the status of DPL module 10 indicating that additional learning may be useful in training a model. In addition, self-supervised self-supervision system 22 may determine not to add new virtual evidence 28 to DPL module 10 based on the status of DPL module 10 indicating additional learning may not be useful in training a model. Thus, depending on the output 20 of DPL module 10 (e.g., the refined virtual evidence and the trained deep neural network 18), self-supervised self-supervision system 22 may decide whether to continue training a model or terminate the training of the model.

Self-supervised self-supervision system 22 may include a structured self-training component 24 that may automatically generate the new virtual evidence 28. As such, structured self-training component 24 may continue to add new virtual evidence 28 for use with DPL module 10 without human input.

In addition, self-supervised self-supervision system 22 may include a featured-based active learning component 26 that may send possible factors for the new virtual evidence 28 to one or more individuals 108 (up to n, where n is an integer) for review and/or input. Example individuals 108 may include, but are not limited to, experts or specialists in a field, and/or the general public. For example, individuals 108 may need subject matter expertise to interpret the data and/or provide annotations for the data. Individuals 108 may provide a response, such as, but not limited to a label for the factors and/or or a verification of a label applied to the factors. In addition, individuals 108 may abstain from providing a label to the factors. The featured-based active learning component 26 may generate the new virtual evidence 28 based on the response received from individuals 108.

In an implementation, self-supervised self-supervision system 22 may implement an algorithm for generating new virtual evidence. The algorithm may be denoted as:

---

Algorithm 2: ProposeVE

Result: Parameters $\phi$, $\psi$ for trained models
Given $P(v = 1|y, x, \overline{\phi}^0)$;
Initialize $P(Y|x_i, \overline{\psi}^0)$ uniform;
for $t \in \{1, \ldots, T\}$ do
    $\phi, \psi$ = ParameterLearn($\overline{\phi}^0, \overline{\psi}^0$);
    Initialize $F_{new} = 0$;
    for $r \in \{1, \ldots, R\}$ do
        Given a set of factor templates $F_r = \{f(x,y)\}$;
        Define a score function $s_{\phi,\psi}^r: F_r \to \mathbb{R}$;
        Find f = arg $\max_{f \in F_r} s_{\phi,\psi}^r (f)$;
        if Review(f) then
            Add f to $F_{new}$ with initial parameter of $\phi_f$;
        end
    end $$P(v=1 | \overline{\sigma}^{t+1}, y, x) \leftarrow \frac{1}{Z'} P(v=1 | \overline{\sigma}^t, y, x) \prod_{f \in \mathcal{F}_{new}} \exp(\phi_f f(x,y));$$

end

---

The algorithm may initialize the DPL module 10 and may call one iteration of the DPL module 10. The algorithm illustrates a meta-algorithm where at each iteration, the algorithm uses the output of DPL module 10 to define a set of score functions over factor templates denoted as:

$F=\{f(x,y)\}$

The highest-scoring factors f are then used to update factor graph 12 for the next iteration of the DPL module 10 with initial parameters $\phi$f, provided they pass a review (potentially a non-existent review). For example, the review may include always accepting the factor (e.g., structured self training) or the review may include sending the factor for human review. The algorithm may be viewed as a structured form of self-training, structure learning in a factor graph, or feature-based active learning, depending on which score function may be chosen by the algorithm in each iteration and how the new parameter may be specified.

Self-supervised self-supervision system 22 may provide the new virtual evidence 28 to DPL module 10 to add to factor graph 12. As such, the updated factor graph 12 may include the initial set of virtual evidence 15 (e.g., virtual evidence 14a, 14b) and the new virtual evidence 28 (e.g., virtual evidence 30a, 30b, 30c). DPL module 10 may use the updated factor graph 12 to re-train the deep neural network 18 using all the virtual evidence (e.g., the initial set of virtual evidence 15 and the new virtual evidence 28) and DPL module 10 may refine the virtual evidence parameters. One example of refining the virtual evidence parameters may include modifying or changing weights of existing virtual evidence. Another example of refining the virtual evidence parameters may include changing a label of existing virtual evidence.

One example task may include sentiment analysis. For example, a set of factor templates denoted as:

$F(x,y)$ may be provided to factor graph 12 that defines the virtual evidence (e.g., virtual evidence 14a, 14b, 30a, 30b, 30c). Where "x" is the sentence, "y" is the label, and the output provided by the deep neural network 18 of F(x,y) indicates whether the sentence contains a particular word and y is equal to a particular label. DPL module 10 may train the deep neural network 18 using the virtual evidence. For example, if the word "good" is associated with a positive sentiment (e.g., plus 1), and the sentence "the movie was good" contained the word "good", then the deep neural network 18 may provide a positive sentiment label (e.g., plus 1) for the sentence "the movie was good."

By adding new virtual evidence 15 to factor graph 12, self-supervised self-supervision system 22 may add structure to DPL module 10. In addition, by adding new pieces of virtual evidence 15 to factor graph 12, deep neural network 18 may continue to provide new labels for data and the new labels may be used by DPL module 10 to train deep neural network 18. Deep neural network 18 may continue to refine or otherwise modify labels associated with the new virtual evidence 25 when errors or gaps occur in the labels. As such, the new virtual evidence 15 generated by self-supervision system 22 may be more complex covering multiple rules for labeling variables and/or reducing gaps or missing information in the rules for labeling variables. Thus, environment 100 may be used to improve the machine learning training process of models by automatically increasing the virtual evidence used in training the models.

Figure 2:
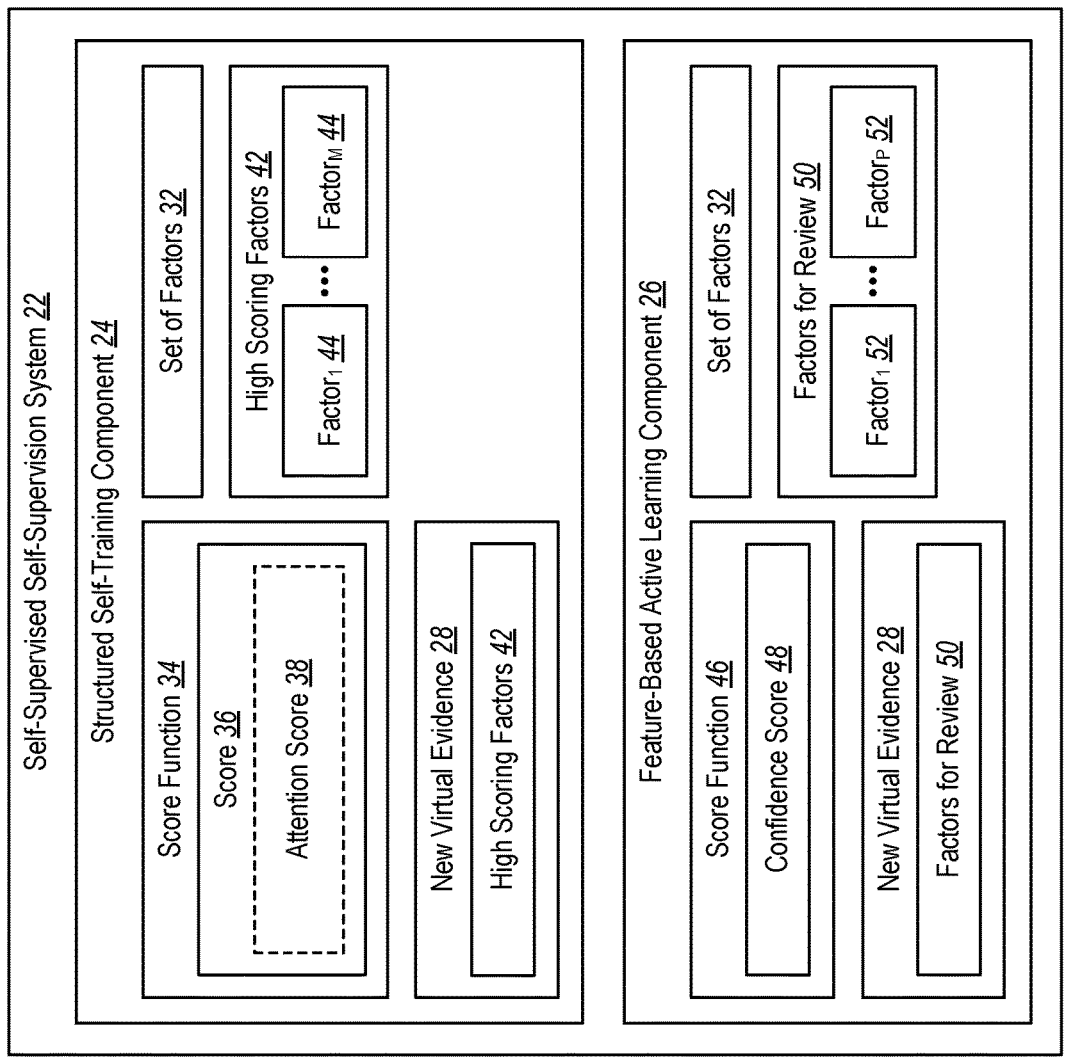
FIG. 2 illustrates an example self-supervised self-supervision system in accordance with an implementation of the present disclosure.

Referring now to FIG. 2, illustrated is an example schematic diagram of a self-supervised self-supervision system 22 used with environment 100. Self-supervised self-supervision system 22 may include a structured self-training component 24 that may apply a score function 34 to generate a score 36 for a set of factors 32. The set of factors 32 may include any function of the observed data and latent label variables. For example, the set of factors 32 may be any Boolean function of an input. One example set of factors 32 may include an entire data set of potential words to add to factor graph 12. Another example set of factors 32 may include pairs of words and associated sentiments, such as "great" and "positive." As such, the set of factors 32 may be functions that represent the virtual evidence and define a probabilistic distribution over unknown label variables. The score function 34 may be a function of the output 20 of the DPL module 10 and one or more factor templates to add to the factor graph 12. Each factor of the set of factors 32 may have an associated score 36.

An example of a score 36 may include an attention score 38. An attention score 38 may indicate a total amount of usage of the factor across the dataset. In the example use case of performing a sentiment analysis, the deep neural network 18 may use the attention score 38 to determine whether a word is associated with a polarity (e.g., positive or negative). For example, the deep neural network 18 may use the attention score 38 to identify that the word "great" is similar to the word "good" and may apply a similar positive sentiment label to the word "great" that is applied to the word "good." The attention score 38 may also be used to identify which words in a sentence the deep neural network 18 may review or look at when determining a label for the sentence. For example, a high attention score 38 for a word may indicate that a word may indicate a word is more relevant to a classification, while a low attention score 38 may indicate that the word is infrequently used and/or has a low relevance to a classification.

An example attention score equation is denoted as:

$$s_{attn}(w, y) = \frac{1}{C_w}\left(TA(w, y) - \sum_{y' \neq y} TA(w, y')\right).$$

Where "TA" is the total attention, "w" is a word, and "y" is any label, depending on the task being performed. For example, y may be a sentiment label when the task is a sentiment analysis. The attention score 38 may be used by the deep neural network 18 to learn to focus on words that may be relevant to a particular task. In addition, the attention score 38 may be used in determining which factors from the set of factors 32 to add as new virtual evidence 28. In an implementation, the attention score 38 may be normalized by frequency of use for the words.

In an implementation, the sentences and words may be encoded into a continuous vector space to provide a more flexible representation of the words. The deep neural network 18 may learn the embedding and may use similarity to score joint factors in the continuous vector space. An example joint factors score function is denoted as:

$$s_{sim}(f_{ij}) = \frac{\langle \tilde{x}_i, \tilde{x}_j \rangle}{\|\tilde{x}_i\| \|\tilde{x}_j\|}.$$

Where xi, xj have similar representations. A joint factor may be added for the top J pairs (i, j) in terms of cosine similarity between x̃i and x̃j, indicating that the labels Yi and Yj should be similar.

Structured self-training component 24 may determine high scoring factors 42 by ranking the score 36 of each factor relative to each other in a descending order from the highest to lowest. Structured self-training component 24 may automatically generate new virtual evidence 28 with the high scoring factors 42. High scoring factors 42 may include one or more factors 44 (up to m, where m is an integer) to add as new virtual evidence 28.

By automatically generating new virtual evidence 28, structured self-training component 24 may add new virtual evidence 28 to DPL module 10 without assistance from individuals 108 and/or input from individuals 108. Moreover, structured self-training component 24 may continue to automatically add new virtual evidence 28 until DPL module 10 does not appear to be able to learn anymore using deep neural network 18 and/or the discriminative or conditional model is trained.

Self-supervised self-supervision system 22 may also include a featured-based active learning component 26 that may generate new virtual evidence 28 for use with DPL module 10. Featured-based active learning component 26 may apply a score function 46 to generate a confidence score 48 for the set of factors 32. The score function 34 used for structured self training may be different than a score function 46 used for featured based active learning. The confidence score 48 may indicate a level of uncertainty in a predicted label for a factor. For example, a confidence score 48 may indicate a high confidence in the predicted label or a low confidence in the predicted label.

Featured-based active learning component 26 may use the confidence score 48 to determine factors for review 50. Feature-based active learning component 26 may select the factors for review 50 with a highest level of uncertainty. By sending the factors for review 50 with low confidence (e.g., the highest level of uncertainty), individual 108 may help resolve any uncertainty in the predictions for the new virtual evidence 28.

The factors for review 50 may include one or more factors 52 (up to p, where p is an integer) to send to one or more individuals 108 for review. For example, feature-based active learning component 26 may send a single factor 52 for review. Another example may include feature-based active learning component 26 sending a group of factors 52 for review. By sending a group of factors 52 for review, feature-based active learning component 26 may resolve a larger amount of uncertainty with a single query to individuals 108 and/or fewer queries to individuals 108. The review may include, but is not limited to, providing a label for factors 52, verifying a label provided for factors 52, and/or abstaining from providing a label for factors 52.

Feature-based active learning component 26 may generate new virtual evidence 28 with the factors for review 50 to add as the new virtual evidence 28 based on the response from individuals 108. Feature-based active learning component 26 may include all the factors for review 50 to add as the new virtual evidence 28. In addition, feature-based active learning component 26 may include a portion or subset of the factors for review 50 to add as the new virtual evidence 28. Thus, instead of adding all the factors for review 50 as the new virtual evidence 28, feature-based active learning component 26 may select a subset of the factors sent for review to add as the new virtual evidence 28.

Self-supervised self-supervision system 22 may use one or more diagnostics to choose whether to select structured self-training performed by structured self-training component 24 to generate new virtual evidence 28 or to select featured-based active learning performed by featured-based active learning component 26 to generate new virtual evidence 28.

By adding new virtual evidence to DPL module 10, DPL module 10 may continue to learn additional labels for variables, and thus, continue to automatically train a model using the new labels.

Figure 3:
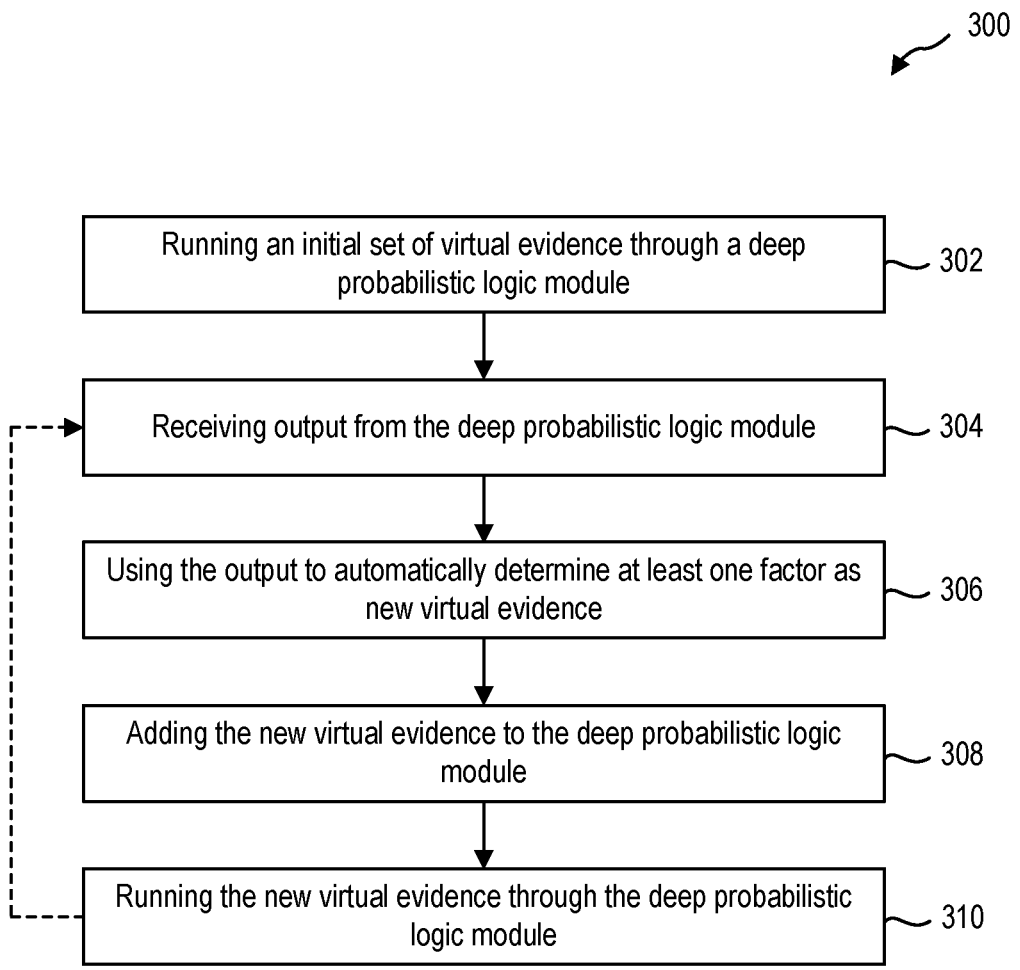
FIG. 3 illustrates an example method for automatically determining new virtual evidence in accordance with an implementation of the present disclosure.

Referring now to FIG. 3, an example method 300 may be used by self-supervised self-supervision system 22 (FIG. 1) for determining new virtual evidence 28 (FIG. 1). The actions of method 300 may be discussed below with reference to the architecture of FIGS. 1 and 2.

At 302, method 300 may include running an initial set of virtual evidence through a deep probabilistic logic module. Self-supervised self-supervision system 22 may initiate or otherwise communicate a request to DPL module 10 to perform at least one iteration of processing on an initial set of virtual evidence 15. For example, self-supervised self-supervision system 22 may initialize DPL module 10 and call an iteration of DPL module 10 with the initial set of virtual evidence 15.

The initial set of virtual evidence 15 may be used to create a factor graph 12 to provide to DPL module 10. DPL module 10 may use the factor graph 12 for producing labels to use in training a model (e.g., deep neural network 18). The initial set of virtual evidence 15 may include a plurality of virtual evidence 14a, 14b that may define a probabilistic distribution of variables over the unknown latent variable labels 16. The initial set of virtual evidence 15 may be predefined using, for example, a knowledge base to determine a distribution over the latent variable labels 16. The plurality of virtual evidence 14a, 14b may be used to define a probabilistic distribution over latent variable labels 16.

Deep neural network 18 may use the virtual evidence 14a, 14b in combination with the latent variable labels 16 to resolve differences and/or any contradictions in the rules for providing labels to variables. The initial labels provided to the variables using the virtual evidence 14a, 14b may be noisy and general. In addition, the labels provided to the variables using the virtual evidence may be missing items and/or the labels may be wrong. As the deep neural network 18 continues to learn, the deep neural network 18 may fix and/or resolve any errors in the predicted labels for the variables by factor graph 12. As such, the predictions generated by factor graph 12 for the labels of the variables included in the virtual evidence 14a, 14b may continuously improve by using the labels outputted by deep neural network 18.

At 304, method 300 may include receiving output from the deep probabilistic logic module. Self-supervised self-supervision system 22 may receive the output from DPL module 10. Upon completion of at least one iteration of the DPL module 10 using the initial set of virtual evidence 15, DPL module 10 may provide output 20 with a factor graph 12 with the virtual evidence 14a, 14b and the latent variable labels 16. In addition, the output 20 may provide a current state of the virtual evidence 14a, 14b and a current state of the run of the deep neural network 18. For example, the output 20 may be a stabilized factor graph 12 with any revisions to the factor graph (e.g., changes or modifications to the predicted labels for virtual evidence 14a, 14b).

At 306, method 300 may include using the output to automatically determine at least one factor as new virtual evidence. Self-supervised self-supervision system 22 may receive the output 20 from the DPL module 10 and may use the output 20 to automatically determine one or more factors to propose as new virtual evidence 28 to add to the factor graph 12 of DPL module 10. DPL module 10 may represent the new virtual evidence 28 as factors in factor graph 12 over the unknown labels. Factors may include any function of the observed data and latent label variables and may represent the virtual evidence. Self-supervised self-supervision system 22 may use the output 20 to understand a current state or status of the virtual evidence 14a, 14b and a current state or status of the deep neural network 18. Self-supervised self-supervision system 22 may use the state or status of DPL module 10 when proposing factors to add as new virtual evidence 28.

Self-supervised self-supervision system 22 may include a structured self-training component 24 that may automatically determine one or more factors to propose as new virtual evidence 28. The structured self-training component 24 may automatically add the new factors as new virtual evidence 28 without human input.

In addition, self-supervised self-supervision system 22 may include a featured-based active learning component 26 that may send proposed factors for the new virtual evidence 28 to one or more individuals 108 for review and/or input. Individuals 108 may provide a response, such as, but not limited to a label for the factors and/or or a verification of a label applied to the factors. The featured-based active learning component 26 may generate the new virtual evidence 28 using the proposed factors based on the response received from individuals 108.

At 308, method 300 may include adding the new virtual evidence to the deep probabilistic logic module. Self-supervised self-supervision system 22 may add the new virtual evidence 28 to factor graph 12 for use with DPL module 10. As such, factor graph 12 may include the initial set of virtual evidence 15 (e.g., virtual evidence 14a, 14b) and the new virtual evidence 28 (e.g., virtual evidence 30a, 30b, 30c). By adding new virtual evidence 28 to factor graph 12, self-supervised self-supervision system 22 may change the structure of factor graph 12.

At 310, method 300 may include running the new virtual evidence through the deep probabilistic logic module. Self-supervised self-supervision system 22 may initiate or otherwise communicate a request to DPL module 10 to perform at least one iteration of processing using the modified factor graph 12 with the new virtual evidence 28 (e.g., virtual evidence 30a, 30b, 30c) and the initial set of virtual evidence 15 (e.g., virtual evidence 14a, 14b). DPL module 10 may use the updated factor graph 12 to re-train the deep neural network 18 using the initial set of virtual evidence 15 and the new virtual evidence 28.

Method 300 may optionally return to 304 and receive the output 20 from the DPL module 10 after running the new virtual evidence 28. Self-supervised self-supervision system 22 may automatically propose new factors to add as additional new virtual evidence 28 to DPL module 10 in response to the new output 20 received from DPL module 10. Method 300 may continue to self-iterate adding new virtual evidence 28 for use with DPL module 10 until self-supervised self-supervision system 22 determines that a model is trained. Once the model is trained, self-supervised self-supervision system 22 may stop adding new virtual evidence 28 to run through DPL module 10.

As such, method 300 may use the initial set of virtual evidence 15 to automatically expand and/or grow the virtual evidence used with DPL module 10. By adding structure to DPL module 10 using new virtual evidence 28, DPL module 10 may continue to learn new labels for variables to help automatically train a discriminative or conditional model.

Figure 4:
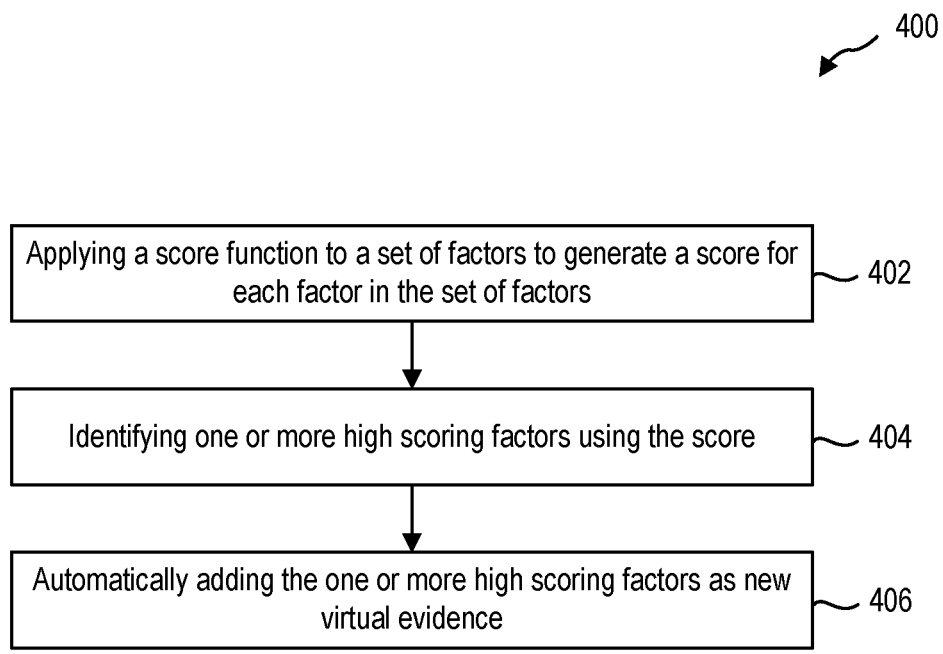
FIG. 4 illustrates an example method for structured self-training for determining new virtual evidence in accordance with an implementation of the present disclosure.

Referring now to FIG. 4, an example method 400 may be used by self-supervised self-supervision system 22 (FIG. 1) for structured self-training of new virtual evidence 28 (FIG. 1). The actions of method 400 may be discussed below with reference to the architecture of FIGS. 1 and 2.

At 402, method 400 may include applying a score function to a set of factors to generate a score for each factor in the set of factors. Self-supervised self-supervision system 22 may include a structured self-training component 24 that may apply a score function 34 to generate a score 36 for a set of factors 32. The set of factors 32 may include any function of the observed data and latent label variables. For example, the set of factors 32 may be any Boolean function of an input. One example set of factors 32 may include an entire data set of potential words or sentences to add to factor graph 12. Another example set of factors 32 may include pairs of words and associated sentiments, such as "great" and "positive." As such, the set of factors 32 may be functions that represent the virtual evidence and define a probabilistic distribution over unknown label variables. The score function 34 may be a function of the output 20 of the DPL module 10 and one or more factor templates to add to the factor graph 12. Each factor of the set of factors 32 may have an associated score 36.

An example score 36 may include, but is not limited to, an attention score 38. An attention score 38 may indicate a total amount of usage of the factor across the dataset. The attention score 38 may be used to identify which words in a sentence the deep neural network 18 may review or look at when determining a label for the sentence. For example, a high attention score 38 for a word may indicate that a word is more relevant to a classification, while a low attention score 38 may indicate that the word is infrequently used and/or has a low relevance to a classification. In the example use case of performing a sentiment analysis, the deep neural network 18 may use the attention score 38 to determine whether a word is associated with a polarity (e.g., positive or negative). For example, the deep neural network 18 may use the attention score 38 to identify that the word "great" is similar to the word "good" and may apply a similar positive sentiment label to the word "great" that is applied to the word "good."

At 404, method 400 may include identifying one or more high scoring factors using the score. Structured self-training component 24 may determine high scoring factors 42 by ranking the score 36 of each factor relative to each other in a descending order from the highest to lowest score 36.

At 406, method 400 may include automatically adding one or more high scoring factors as new virtual evidence. Structured self-training component 24 may automatically generate new virtual evidence 28 with the high scoring factors 42. High scoring factors 42 may include one or more factors 44 (up to m, where m is an integer) to add as new virtual evidence 28. For example, the high scoring factors 42 may include a single factor 44 with the highest score 36. In addition, the high scoring factors 42 may include a plurality of a plurality of factors 44 with a predetermined number of highest scores 36 (e.g., the top 10 scores or the top 5 percent of the scores).

Method 400 may be used by self-supervised self-supervision system 22 to continually learn additional labels for variables without human input, and thus, continue to automatically train a model using the new labels.

Figure 5:
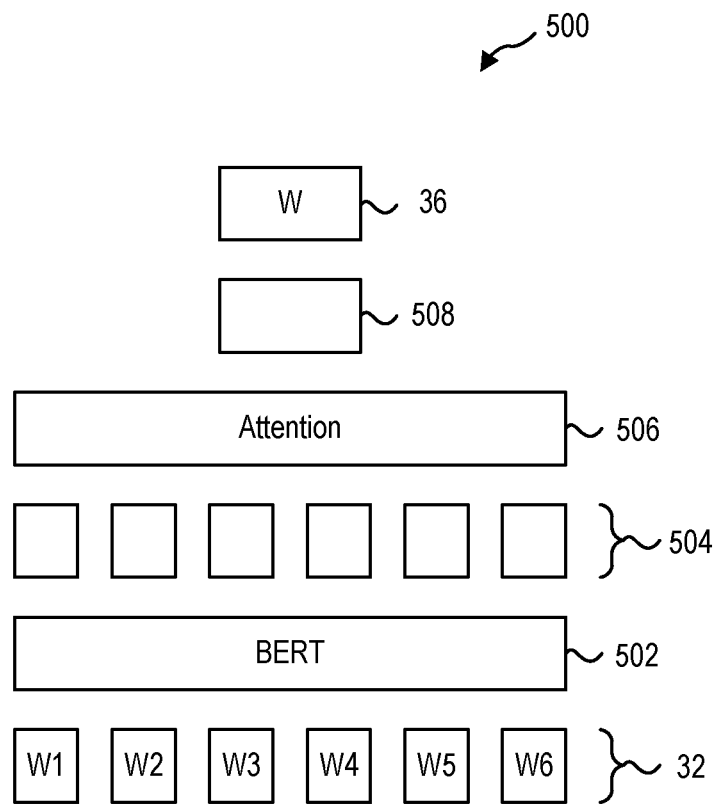
FIG. 5 illustrates an example neural architecture for use with scoring in accordance with an implementation of the present disclosure.

Referring now to FIG. 5, illustrated is an example neural architecture 500 for use with scoring a set of factors 32. The input to the neural architecture 500 may include a sentence for classification. The set of factors 32 in this example may correspond to words from the sentence (e.g., W1, W2, W3, W4, W5, W6). The input sentences may be supplied to a pretrained Bidirectional Encoder Representations from Transformers (BERT)-based uncased model 502. The BERT-based uncased model 502 may be used to obtain contextual embeddings for each word in the input sentence. The output 504 (e.g., the contextual embeddings) for each word from the BERT-based uncased model 502 may be passed to a global-context dot-product attention layer 506. The global-context dot-product attention layer 506 may be used to generate a pooled embedding for the entire input sequence of words. The pooled embedding may be passed through a linear layer 508 to obtain the output logit (e.g., score 36) for each word.

The output logit (e.g., score 36) for each word may be used by self-supervised self-supervision system 22 for determining one or more factors to add as new virtual evidence 28 for use with DPL module 10.

Figure 6:
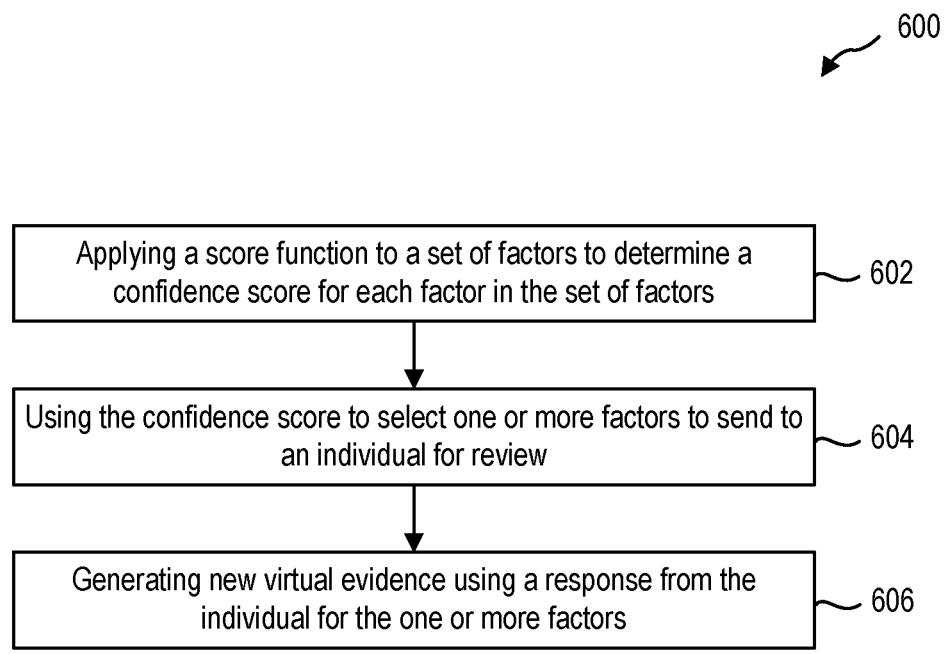
FIG. 6 illustrates an example method for feature-based active learning for determining new virtual evidence in accordance with an implementation of the present disclosure.

Referring now to FIG. 6, illustrated is an example method 600 that may be used by self-supervised self-supervision system 22 (FIG. 1) for feature-based active learning of new virtual evidence 28 (FIG. 1). The actions of method 600 may be discussed below with reference to the architecture of FIGS. 1 and 2.

At 602, method 600 may include applying a score function to a set of factors to determine a confidence score for each factor in the set of factors. Self-supervised self-supervision system 22 may include a featured-based active learning component 26 that may apply a score function 46 to a set of factors 32 and generate a confidence score 48 for the set of factors 32. The confidence score 48 may indicate a level of uncertainty in a predicted label for a factor. For example, a confidence score 48 may indicate a high confidence in the predicted label or a low confidence in the predicted label.

At 604, method 600 may include using the confidence score to select one or more factors to send to an individual for review. Featured-based active learning component 26 may use the confidence score 48 to identify or otherwise select one or more factors for review 50 by individuals 108. Individuals 108 may include, but are not limited to, an expert in a field or area, a specialist in a filed or area, a crowd source of users, and/or the general public. For example, feature-based active learning component 26 may select the factors for review 50 with a highest level of uncertainty (e.g., a low confidence level in the predictions).

The factors for review 50 may include one or more factors 52 (up top, where p is an integer) to send to one or more individuals 108 for review. For example, feature-based active learning component 26 may send a single factor 52 for review. Another example may include feature-based active learning component 26 sending a group of factors 52 for review. By sending a group of factors 52 for review, feature-based active learning component 26 may resolve a larger amount of uncertainty with a single query to individual 108. The review may include, but is not limited to, providing a label for factors 52, abstaining from providing a label, and/or verifying a label provided for factors 52.

At 606, method 600 may include generating new virtual evidence using a response from the individual for the one or more factors. Feature-based active learning component 26 may generate new virtual evidence 28 with the factors for review 50 based on the review to add as new virtual evidence 28 for use with DPL module 10. As such, the new virtual evidence 28 may include a label provided by individual 108. In addition, the new virtual evidence 28 may include a previously applied label verified by individual 108.

Method 600 may use one or more individuals 108 to resolve any uncertainty in predicted labels and/or rules for training a model.

Figure 7:
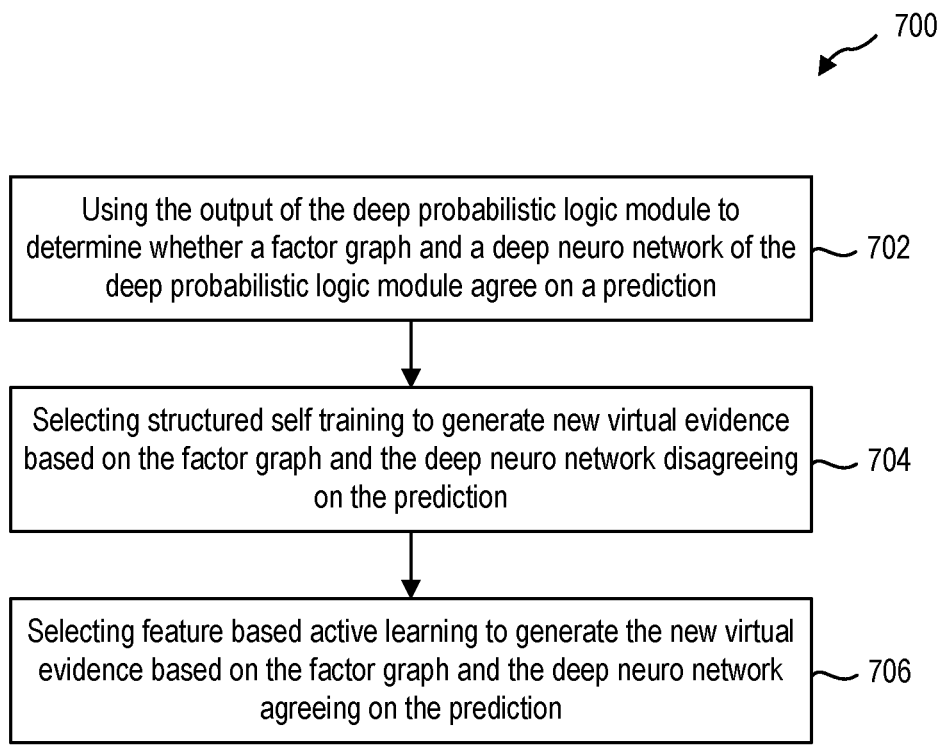
FIG. 7 illustrates an example method for selecting a learning modality in accordance with an implementation of the present disclosure.

Referring now to FIG. 7, an example method 700 may be used by self-supervised self-supervision system 22 (FIG. 1) for selecting a learning modality for generating new virtual evidence 28 (FIG. 1). For example, self-supervised self-supervision system 22 may use method 700 for choosing whether to use structured self training or featured based active learning for generating new virtual evidence 28. Method 700 is an example of one of many diagnostics self-supervised self-supervision system 22 may use in selecting a learning modality. The actions of method 700 may be discussed below with reference to the architecture of FIGS. 1 and 2.

At 702, method 700 may include using the output of the deep probabilistic logic module to determine whether a factor graph and a deep neural network of the deep probabilistic logic module agree on a prediction. Self-supervised self-supervision system 22 may use the output 20 of DPL module 10 to determine whether there is an opportunity for additional learning using the deep neural network 18 of DPL module 10. The output 20 may indicate whether the factor graph 12 and the deep neural network 18 agree on the prediction.

At 704, method 700 may include selecting structured self training to generate new virtual evidence based on the factor graph and the deep neural network disagreeing on the prediction. When the output 20 indicates that the factor graph 12 and the deep network 18 of DPL module 10 disagreed on a prediction, self-supervised self-supervision system 22 may identify additional opportunity for learning using the deep neural network 18. As such, self-supervised self-supervision system 22 may select structured self training for automatically adding additional factors to the new virtual evidence 28.

As long as there is an opportunity for additional learning using the deep neural network 18, self-supervised self-supervision system 22 may continue to use structured self-training component 24 to use structured self-training for automatically adding additional factors to the new virtual evidence 28 because the factor graph 12 may continue to learn from the deep neural network 18 by revising and/or adjusting predicted labels for new virtual evidence 28.

At 706, method 700 may include selecting feature based active learning to generate the new virtual evidence based on the factor graph and the deep neural network agreeing on the prediction. When the output 20 indicates that the factor graph 12 and the deep neural network 18 of DPL module 10 agreed on a prediction, self-supervised self-supervision system 22 may identify a reduction in an opportunity for learning using the deep neural network 18. When the factor graph 12 and the deep neural network 18 agree on the prediction, potentially the same model is being used by both the factor graph 12 and the deep neural network 18, and thus, reducing an amount of learning that may be achieved from the deep neural network 18. When there is a reduction in an opportunity for learning from the deep neural network 18, a query may need to be sent to an individual to provide information for the new virtual evidence 28. As such, self-supervised self-supervision system 22 may select feature-based active learning component 26 to perform feature-based active learning for generating the new virtual evidence 28.

Method 700 may be used by self-supervised self-supervision system 22 to switch between different modalities of learning for generating the new virtual evidence 28 for use with DPL module 10.

Figure 8:
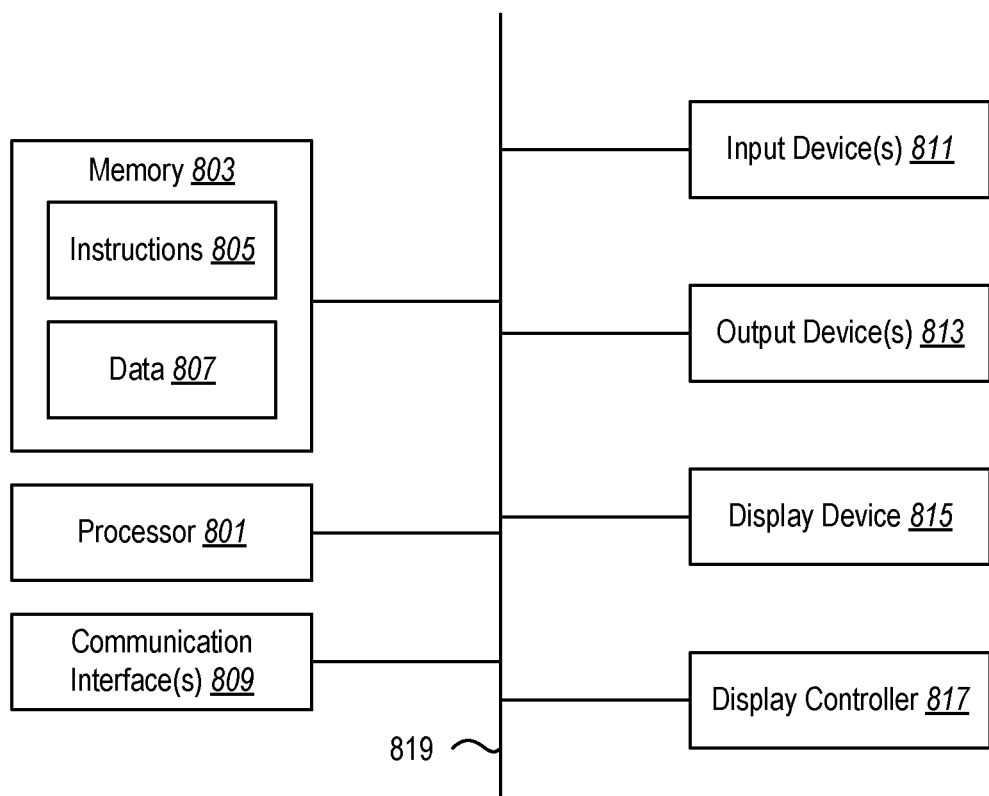
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving output from a deep probabilistic logic module in response to running an initial set of virtual evidence through the deep probabilistic logic module;
   using the output to automatically determine at least one factor as new virtual evidence for use with the deep probabilistic logic module based on a score for the at least one factor, wherein the at least one factor is a function of observed data;
   applying a score function to generate the score for each factor in a set of factors to use with the deep probabilistic logic module, wherein the score function is a function of the output of the deep probabilistic logic module and a factor template to add to a factor graph of the deep probabilistic logic module; and
   adding the new virtual evidence to the deep probabilistic logic module based on the score.

2. The method of claim 1, wherein the method further includes:
   receiving the output from the deep probabilistic logic module in response to running the new virtual evidence and the initial set of virtual evidence through the deep probabilistic logic module;
   using the output to automatically determine new factors for additional virtual evidence to use with the deep probabilistic logic module; and
   adding the additional virtual evidence to the deep probabilistic logic module.

3. The method of claim 1, wherein the method further includes:
   using the score to determine a rank for each factor relative to other factors in the set of factors from a highest score to a lowest score.

4. The method of claim 3, wherein automatically determining the at least one factor for the new virtual evidence uses one or more factors associated with the highest score.

5. The method of claim 3, further comprising:
selecting one or more factors to send to an individual for review based on a confidence score indicating a level of uncertainty in a prediction for the one or more factors; and
generating the new virtual evidence for the one or more factors based on a response from the individual.

6. The method of claim 3, wherein the score function is selected in response to the factor graph of the deep probabilistic logic module and a deep neural network of the deep probabilistic logic module agreeing on a prediction for the initial set of the virtual evidence.

7. The method of claim 3, wherein the score function is selected in response to the factor graph of the deep probabilistic logic module and a deep neural network of the deep probabilistic logic module disagreeing on a prediction for the initial set of the virtual evidence.

8. The method of claim 1, wherein the initial set of virtual evidence is a predetermined set of factors to use in training a model.

9. The method of claim 1, wherein the at least one factor defines a probabilistic distribution over unknown label variables that is used in training a model.

10. A computer device, comprising:
a memory to store data and instructions; and
at least one processor operable to communicate with the memory, wherein the at least one processor is operable to:
receive output from a deep probabilistic logic module in communication with the computer device in response to running an initial set of virtual evidence through the deep probabilistic logic module;
use the output to automatically determine at least one factor as new virtual evidence for use with the deep probabilistic logic module based on a score for the at least one factor, wherein the at least one factor is a function of observed data;
apply a score function to generate the score for each factor in a set of factors to use with the deep probabilistic logic module, wherein the score function is a function of the output of the deep probabilistic logic module and a factor template to add to a factor graph of the deep probabilistic logic module; and
add the new virtual evidence to the deep probabilistic logic module based on the score.

11. The computer device of claim 10, wherein the processor is further operable to:
receive the output from the deep probabilistic logic module in response to running the new virtual evidence and the initial set of virtual evidence through the deep probabilistic logic module;
use the output to automatically determine new factors for additional virtual evidence to use with the deep probabilistic logic module; and
add the additional virtual evidence to the deep probabilistic logic module.

12. The computer device of claim 10, wherein the processor is further operable to:
use the score to determine a rank for each factor relative to other factors in the set of factors from a highest score to a lowest score.

13. The computer device of claim 12, wherein the processor is further operable to automatically determine the at least one factor for the new virtual evidence by using one or more factors associated with the highest score.

14. The computer device of claim 12, wherein the processor is further operable to:
select one or more factors to send to an individual for review based on a confidence score indicating a level of uncertainty in a prediction for the one or more factors; and
generate the new virtual evidence for the one or more factors based on a response from the individual.

15. The computer device of claim 12, wherein the processor is further operable to select the score function in response to the factor graph of the deep probabilistic logic module and a deep neural network of the deep probabilistic logic module agreeing on a prediction for the initial set of the virtual evidence.

16. The computer device of claim 12, wherein the processor is further operable to select the score function in response to the factor graph of the deep probabilistic logic module and a deep neural network of the deep probabilistic logic module disagreeing on a prediction for the initial set of the virtual evidence.

17. The computer device of claim 10, wherein the initial set of virtual evidence is a predetermined set of factors to use in training a model.

18. The computer device of claim 10, wherein the at least one factor defines a probabilistic distribution over unknown label variables that is used in training a model.

19. A non-transitory computer-readable medium storing instructions executable by a computer device, comprising:
at least one instruction for causing the computer device to receive output from a deep probabilistic logic module in communication with the computer device in response to running an initial set of virtual evidence through the deep probabilistic logic module;
at least one instruction for causing the computer device to use the output to automatically determine at least one factor as new virtual evidence for use with the deep probabilistic logic module based on a score for the at least one factor, wherein the at least one factor is a function of observed data;
at least one instruction for causing the computer to apply a score function to generate the score for each factor in a set of factors to use with the deep probabilistic logic module, wherein the score function is a function of the output of the deep probabilistic logic module and a factor template to add to a factor graph of the deep probabilistic logic module; and
at least one instruction for causing the computer device to add the new virtual evidence to the deep probabilistic logic module based on the score.

* * * * *